(12) United States Patent
Poletti et al.

(10) Patent No.: US 8,649,392 B2
(45) Date of Patent: Feb. 11, 2014

(54) IMPLICIT RESERVATION OF RESOURCES IN A POINT-TO-MULTIPOINT OR MULTI-POINT-TO-MULTIPOINT NETWORK

(75) Inventors: Claude Poletti, Fontenay-aux-Roses (FR); Christelle Aime, Bougival (FR); Jean Farineau, Levallois Perret (FR); Marc Cartigny, Chatou (FR)

(73) Assignee: Alcatel Lucent, Paris (FR)

( * ) Notice: Subject to any disclaimer, the term of this patent is extended or adjusted under 35 U.S.C. 154(b) by 1077 days.

(21) Appl. No.: 12/159,941

(22) PCT Filed: Dec. 29, 2006

(86) PCT No.: PCT/FR2006/051445
§ 371 (c)(1),
(2), (4) Date: Dec. 4, 2008

(87) PCT Pub. No.: WO2007/077388
PCT Pub. Date: Jul. 12, 2007

(65) Prior Publication Data
US 2009/0219810 A1 Sep. 3, 2009

(30) Foreign Application Priority Data
Jan. 3, 2006 (FR) .................................. 06 50017

(51) Int. Cl.
*H04J 3/16* (2006.01)
*H04J 3/22* (2006.01)
(52) U.S. Cl.
USPC .......................................................... 370/465

(58) Field of Classification Search
USPC .......................................................... 370/465
See application file for complete search history.

(56) References Cited

U.S. PATENT DOCUMENTS

| 2000/0080816 | | 6/2002 | Spiinar | |
|---|---|---|---|---|
| 2005/0094637 | A1* | 5/2005 | Umesawa et al. | 370/389 |
| 2006/0002336 | A1* | 1/2006 | Stanwood et al. | 370/328 |

FOREIGN PATENT DOCUMENTS

EP   1478195 A1   11/2004

* cited by examiner

*Primary Examiner* — Huy D Vu
*Assistant Examiner* — Adnan Baig
(74) *Attorney, Agent, or Firm* — Wolff & Samson PC (57) ABSTRACT

A point-to-multipoint or multipoint-to-multipoint communication network comprises at least one management center and remote traffic stations, between which radio links sharing resources allocated dynamically by the management center have been established. Each traffic station is tasked, whenever it needs additional resources to increase the useful traffic (UT) that it must transmit to the management center, with adding to the current useful traffic (UT) a first traffic (ST), known as smoothing traffic and representative of a selected margin, and a second traffic (AT), known as anticipated traffic and representative of an anticipated need for additional resources, in order to implicitly solicit the management center, then with determining whether additional resources were allocated by the management center, and, if additional resources were allocated, to increase the useful traffic (UT) by an amount corresponding as much as possible to the sum of the resources corresponding to the first traffic (ST) and allocated additional resources.

24 Claims, 3 Drawing Sheets

IMPLICIT RESERVATION OF RESOURCES IN A POINT-TO-MULTIPOINT OR MULTI-POINT-TO-MULTIPOINT NETWORK

The invention pertains to point-to-multipoint or multipoint-to-multipoint communication networks, in which are defined radio links sharing transmission resources (such as by using the technique known as DAMA (for "Demand Assignment Multiple Access>>)), and more particularly to reserving radio link resources within such networks.

Here, the term "point-to-multipoint or multipoint-to-multipoint communication networks" refers to both satellite communication networks and terrestrial radio communication networks, with or without satellite extensions (or satellite retransmission) over one part of their links. They may, therefore, in particular, be 2 G mobile or cell networks (such as GSM or CDMA), 2.5 G (such as GPRS/EDGE), or 3 G (such as UMTS or CDMA2000), or roaming networks, such as WiFi or WiMax networks.

Here, the term "sharing resources" refers to sharing transmission resources (or capacity) along various communication links, resulting from a distribution of the overall capacity based on the throughput of data that said links are to transmit, or, in other words, based on the number of (active) channels on each link.

The abovementioned communication networks generally include traffic stations (or remote sites) each coupled by a radio link, such as via a satellite relay, to a traffic management center, which is itself coupled to a core network, such as PLMN network. The traffic stations locally manage the communications of subscriber terminals which are located within their radio coverage area, based on the transmission resources (or channels) which are respectively allocated to them at a given moment (each resource allocation cycle) by the traffic management center.

For example, in a GSM cellular telephony network with a satellite extension, each traffic station includes:
  a base station known as BTS (for "Base Transceiver Station") managing at least one radio cell in which subscriber terminals may establish mobile communications,
  a compressor tasked with deleting from the traffic to be transmitted to the management center all elements which are non-essential or which are redundant (such as blank frames, filler frames, invalid frames, rest frames, bits carried by traffic channels at rest, or flags between signaling frames), and
  a satellite transmission terminal tasked with receiving traffic from the management center, and with determining how to distribute the various types of traffic to be transmitted along the transmission resources (or channels) which are at the moment allocated to the satellite link by the management center.

In this same example, the traffic management center comprises:
  a base station controller (or BSC) tasked mainly with managing the transmission resources (or channels) of the satellite links of the various base stations connected to it, as well as the operational and maintenance functions of said base stations,
  a number of demodulators equal to the number of carriers shared by all the radio links, and each tasked with demodulating a carrier arriving from traffic stations in order to restore the compressed frames intended for the base station controller,
  a number of compressors/decompressors equal to the number of demodulators, each tasked with decompressing the frames demodulated and compressed by one of the demodulators and with compressing the frames to be transmitted that are delivered by the base station controller,
  a modulator tasked with modulating the compressed frames intended for the traffic stations, via a carrier frequency, and
  a management module tasked with regularly determining, such as by using the DAMA technique, the distribution of satellite resources (including allocation margins) among the various satellite links Li that are managed by its management center, based on information data representative of the rates of occupation, by type of traffic, of the resources previously allocated to the various satellite links.

In the current abovementioned networks, each traffic station (or remote site) must send the management center explicit requests for reserving resources depending on its needs at the time, which requires a dialogue (or "direct" coupling) with the resource management module of the management center. Such coupling complicates the integration of the compression/decompression devices with the transmission devices, and increases the consumption of capacity on the link in question, for these coupling needs.

Furthermore, whenever a traffic station cannot conduct a dialogue with its management center, the management center cannot take its needs into account during its cyclical transmission resource distribution calculations and/or the traffic station cannot know which transmission resources have been allocated to it.

Additionally, in the abovementioned networks, there is no true call-limiting mechanism intended to avoid overusing a link (which may cause degradation in the calls underway, or even dropped calls, in the event of prolonged congestion).

Moreover, in the abovementioned networks, there is no mechanism for effectively anticipating changes in traffic, taking into account the fact that, firstly, the reaction time of the resource allocation loop is generally between 1 and 3 seconds; secondly, during this reaction time, several new calls may have been made; thirdly, during this reaction time, there is a strong likelihood that on multiple already-established channels, momentarily quiet users will begin to speak; and fourthly, that during this reaction time, channels assigned to data traffic may become active. Certainly, in the latter case, patent document EP 1478195 (or WO 2004 FR 01104) has disclosed a method for anticipating changes in traffic. However, this can only be done locally in each traffic station, based on the resources that were allocated by the management center, and without knowing the margin by which the allocated resources took changes in traffic into account.

The purpose of the invention, therefore, is to fully or partially remedy the abovementioned drawbacks.

To that end, it discloses a method for reserving resources in a point-to-multipoint or multipoint-to-multipoint communication network, in which radio links have been established between remote traffic stations and a management center, said links sharing resources allocated dynamically by the management center.

This method consists, whenever a traffic station needs additional resources to increase the useful traffic that it must transmit to the management center, of adding to that useful traffic a first traffic representative of a selected margin and a second traffic representative of an anticipated need for additional resources, in order to implicitly solicit the management center; then of determining, within that traffic station, whether additional resources were allocated by the management center, and if they were, to increase the useful traffic by an amount as close as possible to the sum of the resources corresponding to the first traffic (initial margin) and the allocated additional resources; or, if no additional resources were allocated, to block any establishment of new traffic channels until additional resources (i.e. sufficient capacity) have been obtained.

The invention also discloses a point-to-multipoint or multipoint-to-multipoint communication network, comprising at least one management center and remote traffic stations, between which radio links sharing resources allocated dynamically by the management center have been established.

This network is characterized by the fact that each of its traffic stations is tasked, whenever it needs additional resources to increase the useful traffic that it must transmit to the management center, with adding to the useful traffic a first traffic representative of an anticipated need for additional resources, in order to implicitly solicit the management center, and then with determining whether the additional resources were in fact allocated by the management center, and if they were, to increase the useful traffic by an amount as close as possible to the sum of the resources corresponding to the first traffic (initial margin) and the allocated additional resources.

The network of the invention may include additional characteristics, which may be taken separately and/or in combination, and in particular:

each traffic station may be tasked with adding a second traffic to its useful traffic augmented by the first traffic, said second traffic corresponding to a whole number N of resource allocation steps for the management center, where N>0;

each traffic station may be tasked with adding a second traffic to its useful traffic augmented by the first traffic, said second traffic being constant or variable and depending on local statistics of the change over time of its useful traffic or respective numbers of transmission channels used by its useful traffic to transmit frames of different types;

each traffic station may be tasked with assigning a priority level to the second traffic and at least one priority level, greater than that of the second traffic, to its useful traffic, and potentially a priority level, between those of the second traffic and useful traffic, to the first traffic;

each traffic station may be tasked with transmitting the second traffic in the absence of useful traffic waiting to be transmitted;

in one variant, each traffic station may be tasked with multiplexing the frames that make up the second traffic with the frames that make up the useful traffic augmented by the first traffic and which are waiting to be transmitted, based on a selected proportion;

each traffic station may be tasked with adding a second traffic to its useful traffic augmented by the first traffic, said second traffic made up of filler frames and check frames.

the management center may then be tasked with sending each check frame that it receives back to the traffic station that transmitted it, and each traffic station may be tasked with determining the time taken by each check frame to return to said traffic station, and to detect a congestion of second traffic whenever this time is greater than a selected threshold;

in a first variant, the management center may be tasked with: detecting the moments when the check frames are received; determining a time slot separating the moments when successive check frames are received from each traffic station; and transmitting an alert signal to a traffic station whenever the duration between the moments when successive check frames that it transmitted were received is greater than a selected threshold. In such a case, each traffic station may be tasked with detecting a congestion of second traffic whenever it receives an alert signal from the management center;

in a second variant, non-exclusive of the first, each traffic station may be tasked with transmitting numbered check frames. In such a case, the management center may be tasked with detecting the number which is associated with each check frame transmitted by each traffic station, and with transmitting an alert signal to a traffic station whenever it does not receive at least one of the check frames that it transmitted in succession; and each traffic station may be tasked with detecting a congestion of second traffic whenever it receives an alert signal from the management center;

in a third variant, each traffic station may be tasked with transmitting check frames that were each assigned a time marker representing the time of creation, synchronized to a clock in the management center. In such a case, the management center may be tasked with dating the moment when each check frame transmitted by each traffic station was received; with determining the transmission duration of each check frame, based on its time of creation and the moment it was received; and with transmitting an alert signal to a traffic station if a variation in the transmission duration of a check frame that it transmitted is detected; and each traffic station may be tasked with detecting a congestion of second traffic whenever it receives an alert signal from the management center;

the management center may be tasked with transmitting alert signals made up of a binary indicator. In one variant, the management center may be tasked with transmitting alert signals made up of a numeric value representing a determined duration whenever said value is greater than the threshold and/or the number of check frames not received. For example, the management center may be tasked with transmitting alert signals made up of a numeric value representing the amplitude of a variation in the detected transmission duration;

the management center may be tasked with detecting each weakening of the receipt of traffic, and each degradation of a link. In this manner, whenever it does not receive one or more check frames coming from a traffic station over a duration greater than a selected threshold, it transmits to that traffic station a warning signaling reporting its inability to make a decision;

each traffic station may, whenever it detects a congestion of second traffic, be tasked with keeping the addition of the second traffic and considering the resources which were available prior to this detection of congestion of second traffic to be allocated resources;

in a first variant, each traffic station may, whenever it detects a congestion of second traffic, be tasked with gradually reducing the second traffic until the congestion of second traffic disappears, and to consider the resources available at the time of the disappearance to be allocated resources;

in a second variant, each traffic station may, whenever it does not detect congestion of second traffic, be tasked with gradually increasing the second traffic until it detects a congestion of second traffic, and to consider the resources which were available prior to this detection of congestion of second traffic to be allocated resources;

in a third variant, corresponding to the usage of alert signals made up of a numeric value representing a duration separating the moments of receiving successive check frames, each traffic station may be tasked with modulating the second traffic by a value that is a function of the difference between the numeric value of the alert signal received and an average value of this numeric value;

each traffic station may, whenever it detects an insufficiency in the resources allocated to it, be tasked with deleting frames on transmission channels (of its link) which had been without activity prior to this detection.

The invention may find a particularly useful application, though not exclusively so, in all point-to-multipoint or multipoint-to-multipoint communication networks, such as satellite communication networks; terrestrial radio communication networks, such as networks based on E1 or T1 and similar technology, or based on Ethernet, IP, Frame Relay, and ATM; and terrestrial radio communication networks using a satellite extension (or satellite offset(s)) over a part of their links, such as TDMA or CDMA cellular networks.

Other characteristics and benefits of the invention shall become apparent upon examining the detailed description below, and the attached drawings, in which.

The attached drawings may serve not only to complete the invention, but also to contribute to its definition, if need be.

The invention pertains to the implicit reservation of transmission resources (and its consequences) within a point-to-multipoint or multipoint-to-multipoint communication network, in which are defined radio links which share resources.

In what follows, it will be assumed by way of a non-limiting example that the communication network is a mobile (or cellular) telephone network, such as a GSM (or 2 G) satellite extension (or satellite retransmission) network. However, the invention is not limited to this type of network. As indicated above, it pertains to all point-to-multipoint or multipoint-to-multipoint communication networks, such as satellite communication networks; terrestrial radio communication networks, such as networks based on E1 or T1 and similar technology, or based on Ethernet, IP, Frame Relay, and ATM; and terrestrial radio communication networks using a satellite extension (or satellite retransmission) over a part of their links, such as TDMA or CDMA cellular networks.

Furthermore, in the following, an implementation of the invention will be described using the BSC-BTS interface of the GSM network. However, the invention is not limited to this type of interface. It pertains to any other network interface, and may also apply to sharing transmission resources among at least two types of interfaces on a single network.

Furthermore, in the following, it shall be assumed that the transmission resource distribution and allocation technique is derived from the technique known as DAMA. However, the invention is not limited to this type of technique. It pertains, in fact, to any technique that makes it possible to dynamically distribute transmission resources among communication links, potentially satellite links.

Figure 1:
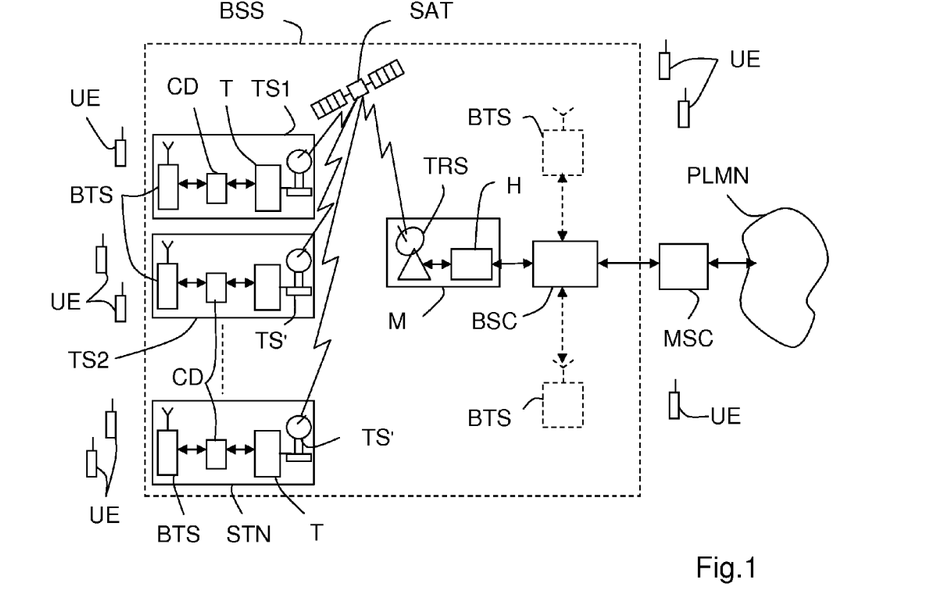
FIG. 1 schematically depicts a part of a satellite-extension communication network that may implement the invention, FIG. 2 schematically depicts an example embodiment of a management center participating in the implementation of the invention, FIG. 3 schematically depicts an example embodiment of a traffic station of the invention.

Firstly, in FIG. 1, an example GSM satellite-extension network that may implement the invention is described, in the abovementioned non-limiting application.

A GSM satellite-extension communication network may, in a schematic fashion, but nonetheless one sufficient for understanding the invention, be described as a conventional radio subsystem, known as a base station system (BSS) coupled to a core network, here embodied (by way of an illustrative example) in the form of a public wired network, such as a PLMN (public land mobile network). The coupling between the BSS system and the public land mobile network PLMN is handled here by a mobile switching center MSC.

The mobile switching center MSC is tasked with performing all tasks needed for managing communications with the user terminals UE.

The system BSS firstly comprises at least one traffic management center MC, for example one configured in the form of a hub H coupled to a transceiver station TRS which performs satellite links (Li) with a satellite communication relay SAT. In some variants, the management center MC and the hub H (the exchange center with remote traffic stations TSi) may be separate or spaced apart from one another.

The system BSS also comprises at least one base station controller BSC coupled both to the traffic management center MC, and more specifically to its hub H, and to the mobile switching center MSC. This controller BSC is primarily tasked with managing the resources of the satellite links (Li) of the various base stations BTS that are connected to it, as well as the operational and maintenance functions of these base stations BTS.

The controller BSC and the base stations BTS are coupled together by means of an interface known as A-bis. This interface is synchronous. It operates with G.704 framing (in such a case, they are called E1 frames, all or some of which includes useful data).

Finally, the system BSS comprises multiple remote traffic stations TSi (i=1 to N) each associated with at least one coverage area in which user terminals UE may establish connections. Each remote traffic station TSi comprises at least one base station BTS (Base Transceiver Station) in the example of a GSM network, a compressor/decompressor CD, and a satellite transmission terminal T coupled to a transceiver device TD' by which the satellite link Li with the satellite SAT is made.

Each base station BTS defines one or more coverage areas for the traffic station TSi. It should be noted, as is depicted by the dotted lines in FIG. 1, that the controller BSC may also be coupled directly to base stations BTS via A-bis interfaces, said base stations being independent from the satellite links Li.

The management center MC of the invention is particularly intended to manage the resources of the satellite SAT, and more precisely, to distribute its resources among the various links Li established between the transceiver station TRS and the remote traffic stations TSi. These links Li use a shared resource (a carrier Lf) in "Forward" or "Downlink" mode (i.e. from the hub H to the remote stations TSi) and a set of carriers (Lr) shared between all links in "Return" or "Uplink" mode (i.e. from the remote stations TSi to the hub H).

Figure 2:
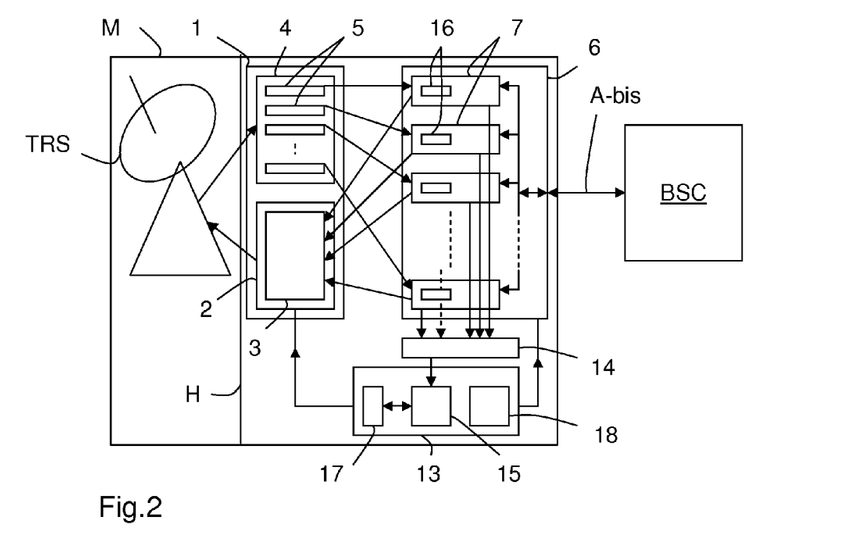

As is depicted in FIG. 2, the hub H (which here forms part of the traffic management center MC) firstly includes a modem 1 made up of a first set 2 of modulator(s) 3 and a second set 4 of demodulators 5.

In the example depicted, the first set 2 includes a single modulator 3 tasked with producing a modulated carrier used by all of the remote sites TSi, and with modulating the frames arriving from the controller BSC, and intended for all of the remote traffic stations TSi via the carrier frequency Lf.

The second set 4 includes a number of demodulators 5 equal to the number of carriers Lr used by the traffic stations TSi. Each demodulator 5 is intended to demodulate the carrier arriving from a remote traffic station TSi, and thereby to restore the compressed frames intended for the controller BSC. For example, the modem 1 is intended to ensure the full-duplex sending and receiving of time slots, which corresponds to the transmission mode known as TDMA.

The hub H also comprises compression and decompression (or expansion) means 6 coupled to the modem 1 and including, in the example depicted, as many compressors/decompressors (or compressors/expanders) 7 as demodulators 5. More precisely, each compressor/decompressor 7 is supplied with demodulated frames and compressed by one of the demodulators 5, for example via a switching matrix (not depicted), and feeds one of the modulators 3 with compressed frames to be modulated via said switching matrix.

The compression portion of a compressor/decompressor 7 handles the compression of the frames to be transmitted and the adaptation of the formatting of the data blocks to the interface with the modem 1, which is an Ethernet, IP, or ATM interface. The decompression section of a compressor/decompressor 7 handles the adaptation to the interface with the modem 1. Said interface is generally of the same type as the compression section, and the restoration, via decompression, of the initial frames (i.e. the way they were before being compressed within a traffic station TSi).

Any compression technique relying upon the analysis of the time change of the respective contents of the transmission channels may be used. As a reminder, a channel is said to be passive whenever it has a static or repetitive binary pattern, known as a rest pattern, while a channel is said to be active whenever it does not have a static or repetitive pattern. In the presence of compressed silence, compressed invalid frames, and/or compressed rest frames, a channel is said to be passive if the frames that it is carrying are frames identified by their header as a silence frame, invalid frame, or rest frame. Only the active channels are transmitted in full (without compression), the inactive channels being compressed, i.e. the useless or redundant elements are deleted prior to transmission (potentially by satellite transmission) and are restored in an identical or nearly identical form when decompressed.

It is important to note that there is no bijection between the number of carriers Lr and the number or remote sites TSi. On the other hand, there must be bijection between a remote compressor of a remote site TSi, and therefore a link Li, and a compressor/decompressor 7 of the hub H. Furthermore, a compressor/decompressor 7 of the hub H feeds multiple links Li, and therefore multiple remote sites, and therefore multiple decompressors (or expanders), each remote site TSi having one decompressor, each decompressor restoring the same frame as the other decompressors operating on the compressed frame.

The invention applies to frames whose size (or format) varies depending on the number of active channels, and therefore the throughput of the link, as is described, in particular, in patent document EP 1478195 (or WO 2004 FR 01104).

The hub H also comprises a management module 13 coupled to the modem 1 and to the compression and decompression means 6, and more precisely, to its various compressors/decompressors 7, preferably via a mediation and concentration module 14.

This management module 13 is tasked with determining, preferably periodically (or cyclically), a primary distribution, between the various satellite links Li that manages its management center, of the satellite resources, including allocation margins. This determination is made based at least on first information data representing the occupation rates, per type of traffic, of the resources previously allocated to the various satellite links Li. Each traffic station TSi may thereby determine a secondary distribution, between its various types of traffic, of the resources that were allocated to its link by the primary distribution, taking into account at least one of its own occupation rates per type of traffic. For example, one may use the secondary distribution determination technique described in the patent document EP 1478195 (or WO 2004 FR 01104).

In the example described here, the management module 13 operates using an allocation technique derived from the technique known as DAMA (for "Demand Assignment Multiple Access"). In this DAMA-derived technique, the management module 13 comprises a resource allocation module 15 tasked with determining the primary distribution of the resources, depending on the occupation rates per type of traffic. These occupation rates are delivered to it by the compressors/decompressors 7, and more precisely by a load assessment module 16 that they each comprise, via the mediation and concentration module 14. Each load assessment module 16 operates on the output of the decompression function of the decompressed frames. It determines, in each decompressed frame of first information data representing the occupation rates per type of traffic (compression signaling traffic, network signaling traffic (here, for a GSM network), voice traffic, and data traffic, for example).

The first information data is either contained within the received frames (consequently, they were previously determined by the traffic stations TSi based on the feeds of any type received from its base station(s) BTS), or determined based on the content of the frames received.

In either case, the load assessment module 16, during each allocation cycle (or period), transmits the occupation rates per type of traffic, for each satellite link Li, to the resource allocation module 15. As a reminder, the resource allocation delay is on the order of one to three seconds for a system running in DAMA mode.

To determine the primary distribution, the resource allocation module 15 preferentially stores all occupation rates per type of traffic and per link Li, which it receives from the detection modules 16. Next, it determines, preferably by extrapolation, and for each traffic station TSi (or link Li), the resources, not counting the allocation margin, which it needs for each of its types of traffic, taking into account the occupation rates per type of traffic (which had just been determined).

This extrapolation may also take into account the extrapolated capacity needs of the base stations TSi. In fact, due to the discrepancy in time between the capacity measurement used and the actual allocation of capacity, the stream applied at the input of the traffic station TSi by the base station BTS associated with it may exceed the capacity allocated by the management center MC. The extrapolation process introduces a margin intended to reduce the risk of congestion related to this discrepancy in time between the measurement and the actual allocation of capacity.

During each allocation cycle, the resource allocation module 15 therefore receives first information data (occupation rate observed per link Li), and determines allocation margins based on this received data and traffic change data, each of which characterizes links Li (or each traffic station TSi) and is preferentially stored within a first memory 17 and the management module 13.

This traffic change data may be representative either of a static (or analytical) traffic change model, which may potentially be renewed on a regular basis, or of a dynamic model of traffic change.

The determination of allocation margins and their distribution between the various links Li may, for example, be performed using the technique described in the patent document EP 1478195 (or WO 2004 FR 01104).

The distribution of the various margins constitutes an operating point which is updated each cycle, taking into account the first information data.

The total margin Mi assigned to each satellite link Li is added to the resources Ri which had previously been extrapolated for it. This provides the primary distribution of the allocation cycle.

The compression/decompression means 6 and the management module 13 preferentially constitute a compressor handling the function of DAMA management.

Figure 3:
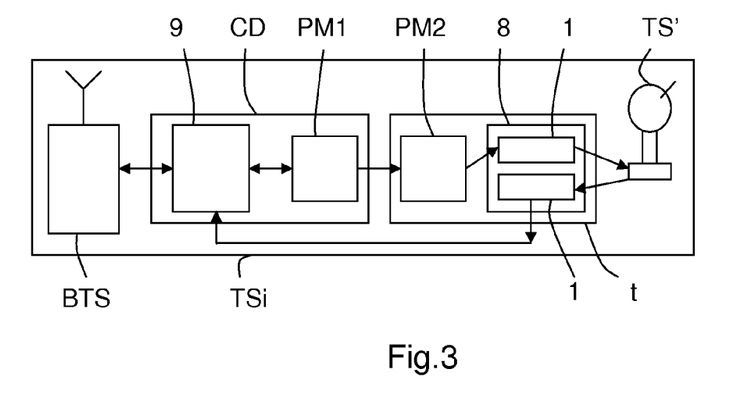

We now refer to FIG. 3 to describe an example embodiment of a traffic station TSi of the invention.

The compressor/decompressor CD of each traffic station TSi is of the type of those that the management center MC comprises. In particular, it comprises a compression/decompression module 9 and a first processing module PM1, which will be described later. Furthermore, it is coupled to the base station BTS via a G.703 interface (not depicted).

The compression/decompression module 9 receives (from the base station BTS) data streams such as voice frames, data frames, signaling frames, or auxiliary data streams (external streams multiplexed with the preceding compressed streams), and delivers as output (compressed) useful traffic UT to which resources allocated by the management center MC during each allocation cycle correspond.

The satellite transmission terminal T, of each traffic station TSi, firstly comprises a modem 8 of the same type as the one that the management center MC comprises. This modem 8 more precisely comprises a portion 10 dedicated to the modulation of the compressed frames to be transmitted to the management center MC and a portion 11 dedicated to the demodulation of the compressed and modulated frames arriving from the management center MC.

Whenever a new call is detected, or whenever a channel at rest switches to active status (resuming speaking after a period of silence), or whenever a channel becomes active (a signaling frame or data packet is present), the traffic station TSi needs additional resources to increase the (compressed) useful traffic UT that it must transmit to the management center MC.

As previously indicated, in a conventional network, the traffic station TSi which needs additional resources must send a request for resources to the management center MC; said request may not be taken into account by its cyclical resource allocation mechanism, only, at best, during the next cycle. By adding the round-trip time delay between the traffic station TSi and the management center MC, several seconds may therefore pass before a traffic station TSi has the requested additional resources. Therefore, the excess data which must be transmitted using additional resources may not be temporarily saved (or "buffered") during such a delay. They may be buffered for, at most, a few tens of microseconds.

Here, the invention remedies this drawback.

As previously indicated, each compressor/decompressor CD comprises a first processing module PM1 tasked with intervening each time that its traffic station TSi needs additional resources to increase the (compressed) useful traffic that it must transmit to the management center MC and which come from the base station BTS.

More precisely, whenever the abovementioned situation occurs, the first processing module PM1 preferably begins by temporally smoothing down the frames which may be buffered (signaling frames and data frames), which provides a useful smoothed-down (compressed) traffic. Next, it adds a first traffic ST, known as smoothing traffic, to the smoothed-down useful traffic, in order to smooth down the gaps between the peaks of traffic. Thus, a continuous aggregated stream is obtained, whose characteristics vary slowly, in a manner compatible with the reaction time of the resource allocation loop (DAMA). This aggregated stream is known as the smoothed-down traffic ST'.

This smoothing process incorporates the selected margin (defined by the management center MC as previously indicated), which serves to anticipate the potential variations of the compressed stream within the reaction time of the resource allocation loop.

Next, the processing module PM adds to the smoothed-down traffic (useful traffic UT, augmented by the first traffic (or smoothing traffic) ST), a second traffic AT, known as anticipated traffic, representing an anticipation of the need for additional resources, and intended to implicitly solicit the management center MC.

Figure 4:
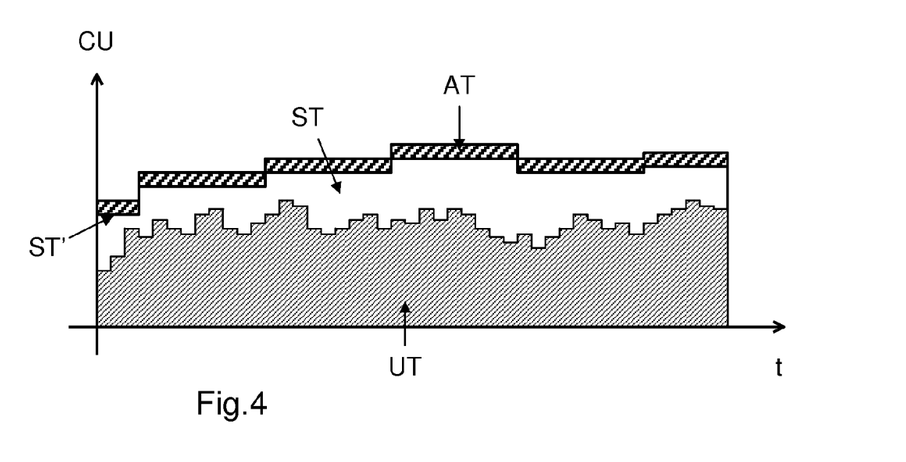
FIG. 4 is a diagram schematically depicting an example graph showing change in the capacity used (CU) by a traffic station over time, respectively for useful traffic (UT), smoothing traffic (ST), smoothed-down traffic (ST'=UT+ST), and anticipated traffic (AT)

In FIG. 4, an example of a graph of the change over time (t) in capacity (or transmission resources) used (CU) by a traffic station TSi respectively for the useful traffic (UT), the smoothing traffic (ST), the smoothed-down traffic (ST'), and the anticipated traffic (AT).

The useful traffic UT, augmented by the first traffic (or smoothing traffic) ST, and the second traffic (or anticipated traffic) AT, and then transmitted to the modem 8, then transmitted to the transceiver device TRS' in order for it to transmit it to the management center MC on the link Li via the satellite SAT.

The traffic station TSi then monitors the traffic that comes from the management center MC in order to determine whether it has allocated additional resources to it, and if so, said traffic station TSi agrees to increase the useful traffic that corresponds as much as possible to the sum of the resources which correspond to the first traffic (initial margin) and any allocated additional resources. In other words, the traffic station TSi accepts the establishment of new channels of useful traffic within the capacity limits corresponding to the additional resources thereby allocated.

It is important to note that adding anticipated traffic AT to the smoothed-down traffic ST' (UT+ST) makes it possible to notify the management center MC that a traffic station TSi needs additional resources, and therefore constitutes an implicit request to reserve resources for said management center MC. The volume (or value) of anticipated traffic AT may, for example, be detected by the load assessment module 16, which is installed in each compressor/decompressor 7 of the hub H, and communicated to the management module 13 of said hub H. The management module 13 may then decide, during the next cycle, whether or not to assign all or some of the additional resources implicitly requested by a traffic station TSi, based on the remaining capacity available for all return paths.

The volume (or value) of anticipated traffic AT which is added to the useful traffic UT augmented by the smoothing traffic ST is significant, because it represents the quantity of additional resources requested of the management center MC. To set its value (or volume), multiple solutions may be foreseen.

In this manner, the anticipated traffic AT which is attached to the useful traffic UT augmented by the smoothing traffic ST may be constant. For example, it may be equal to an integer N (N>0) of resource allocation steps of the management module 13 of the hub H. For example, N=1 may be chosen, which corresponds to one resource allocation steps of the management module 13. One may also choose a value equal to 16 kbps (as a call most commonly consumes 16 kbps). It is possible that the value of the anticipated traffic AT may be constant over predetermined periods, and that said value varies from one period to another depending on the importance of the normal useful traffic within each of these periods. In such a case, during a low-traffic period, a low amount of anticipated traffic AT may be used, whereas during a high-traffic period, a high amount of anticipated traffic AT may be used, but its linear relationship between the values of anticipated traffic during these two periods.

In a first variant, the anticipated traffic AT may permanently be at a maximum in order to reserve, through anticipation, for each link, as many transmission resources as possible, within the limits of overall capacity available for all return paths.

In a second variant, the compressor/decompressor CD of each traffic station TSi may, for example, permanently identify the number of channels being used for voice calls and the number of channels used for transmitting data. Furthermore, one may provide for a table that establishes a correspondence between the volume of anticipated traffic AT to be established, and the respective numbers of voice channels and data channels. This table is then used by the first processing module PM1 of each compressor/decompressor CD to determine, at each moment, the volume of anticipated traffic AT to add to the smoothed-down traffic ST'.

In a third variant, the anticipated traffic AT may take into account statistics of changes in traffic in order to solicit more or less additional resources depending on current traffic characteristics (the percentage of voice traffic, the percentage of data traffic, the percentage of signaling, the change in each type of traffic).

In such a case, the first processing module PM1 of the compressor/decompressor CD measures, at each moment, the capacity actually used within a selected time slot that has just passed, for example, a duration equal to two seconds (the reaction time of a DAMA allocation loop), and compares it to the one actually used during the preceding time slot. Next, it determines the difference between these two capacities used, which corresponds to the variations in compressed useful traffic; said variations may, for example, be equal to +8 kbps, +16 kbps, +24 kbps, +32 kbps, and so on.

The first processing module PM1, using these differences, builds a histogram for a sliding window, such as a duration of fifteen minutes (the traffic actually changes a great deal over the course of a day, but it is strongly correlated within time slots of about fifteen minutes). This histogram is then characterizing the number of times when, during the last fifteen minutes, the difference was equal to 8 kbps, +16 kbps, +24 kbps, and +32 kbps, for example.

Based on this histogram, the first processing module PM1 of the compressor/decompressor CD determines the volume of anticipated traffic that represents the worst case observed at the end of the selected time slot (for example, for a 2-second duration), over the fifteen minutes (sliding window) that had just passed. For example, if the worst case observed, corresponds to 96 kbps more than the current smoothed-down traffic, then the first processing module PM1 sets the anticipated traffic AT to a value equal to 96 kbps.

Figure 5:
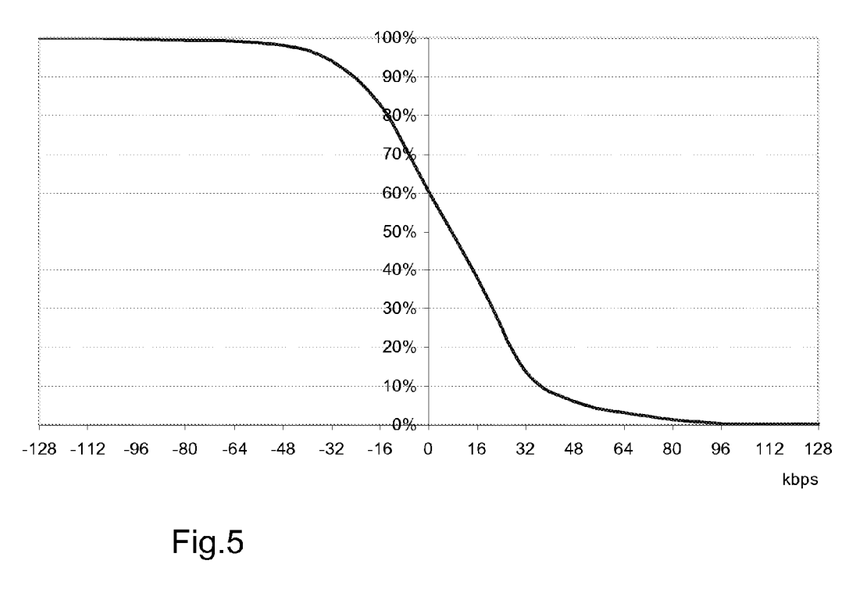
FIG. 5 is a diagram schematically depicting an example cumulative histogram of variations in useful traffic UT in kilobits per second (kbps), and FIG. 6 schematically depicts an example embodiment of a second processing module installed within a transmission terminal of a traffic station of the invention.

FIG. 5 depicts an example cumulative histogram of variations in useful traffic UT in kbps. In this example, in 60% of cases, the variation over two seconds of time is less than or equal to 0 kbps; in 40% of cases it is less than or equal to +16 kbps, and in 1% of cases, it is less than or equal to +80 kbps. This means that with anticipated traffic equal to 80 kbps, 99% of cases are covered. To cover all cases, the anticipated traffic AT is then set at +96 kbps.

The anticipated traffic AT is preferentially made up nearly completely of filler frames AT1. More precisely, it is preferentially made up of filler frames AT1 and check frames AT2, said check frames AT2 being periodically interspersed between sequences of filler frames AT1. For example, a check frame AT2 may be placed every 100 ms.

Furthermore, the anticipated traffic AT is preferentially assigned a lower degree of priority to the one which is assigned to the useful traffic UT (augmented by the smoothing traffic ST) to be transmitted. In this manner, an operating mode may be foreseen in which the anticipated traffic AT is only transmitted on the condition that there is no useful traffic UT waiting to be transmitted. This operating mode is known as "best effort." In one variant, the processing module PM may multiplex the anticipated traffic frames AT with the useful traffic frames UT, based on selected proportions. This operating mode is known as "Weighted Fair Queuing".

To implement best effort or Weighted Fair Queuing operation, a second processing module PM2 may, for example, be used. This second processing module PM2 is preferentially installed in the terminal T of each traffic station TSi, as is schematically and functionally depicted in FIG. 6.

Figure 6:
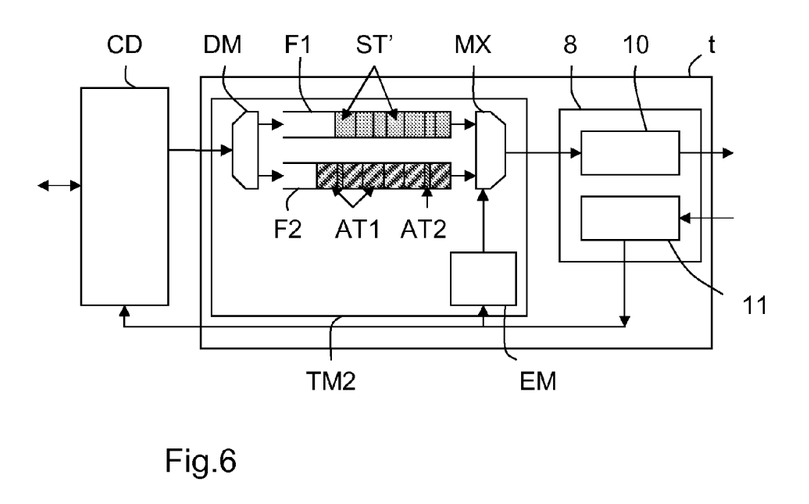

In this example embodiment, the second processing module PM2 firstly comprises a demultiplexer DM tasked with orienting towards the first F1 and second F2 memories, for example FIFO ("First In First Out") memories, respectively, the smoothed-down traffic frames ST' (useful traffic UT+smoothing traffic ST) and the anticipated traffic frames AT (filler frames AT1 and check frames AT2) delivered by the second processing module PM2 of the compressor/decompressor CD.

The second processing module PM2 also comprises an extraction module EM tasked with extracting from the traffic received by its traffic station TSi, and arriving from the management center MC, resource allocation information setting the number of usable resources for each allocation cycle and the position in time of allocated resources.

Finally, the second processing module PM2 comprises a multiplexer MX controlled by the extraction module EM based on resource allocation information and tasked with delivering as output (coupled to the modulator 10 of the modem 8) the frames temporarily stored in the queues of the first F1 and second F2 memories. This multiplexer MX may operate either in best effort mode, or in Weighted Fair Queuing mode.

In the example embodiment described hereinabove, the second processing module PM2 only comprises two memories for temporarily storing the frames of useful traffic UT (potentially smoothed-down traffic ST') and frames of anticipated traffic AT (AT1 and AT2). However, the second processing module PM2 may comprise more than two memories. In fact, it must comprise at least two of them, and may comprise nearly as many of them as there are different types of frames or streams to be transmitted.

By way of an illustrative example, eight memories may be planned, each one associated with eight different priority levels: a first level of priority (the highest) for signaling frames not including measurement frames (as they constitute a very high volume in return or uplink mode, and routing them is less critical in terms of the time they take), a second level (less than the previous one) for voice frames, a third level (less than the previous one) for comfort noise frames, a fourth level (less than the previous one) for data frames, a fifth level (less than the previous one) for non-priority signaling frames (such as measurement frames), a sixth level (less than the previous one) for auxiliary streams (such as multiplexed traffic using the remaining bandwidth), a seventh level (less than the previous one) for filler frames ST used for smoothing down the useful traffic UT found in at least one of the higher priority levels, and an eighth level (less than the previous one, and the lowest overall) for filler frames AT1 and check frames AT2 of the anticipated traffic AT.

In this case, the demultiplexer DM routes each type of frame or stream, delivered by the first processing module PM1 of the compressor/decompressor CD, towards the corresponding memory, and the multiplexer MX multiplexes the frames (or streams) stored within the memories, based on the selected operating mode (best effort or Weighted Fair Queuing) and instructions transmitted by the extraction module EM and defined within the resource allocation table.

Due to the lowest priority assigned to the anticipated traffic AT (AT1 and AT2), if the resources allocated by the management module 13 of the management center MC are insufficient to meet the actual needs for smoothed-down traffic ST' plus anticipated traffic AT, the anticipated traffic is affected instead. This is manifested in the increasing routing delays and losses of filler frames AT1 and/or check frames AT2. This effect is then used to detect a congestion of anticipated traffic over a transmission link Li. Multiple solutions, relying on the use of anticipated traffic AT made up of regularly distributed filler frames AT1 and check frames AT2 (for example, one check frame AT2 every 100 ms), may be provided for in order to detect these congestions.

A first solution consists of configuring each compressor/decompressor 7 of the hub H in such a way as to permanently detect (for example, using its load assessment module 16) the presence of check frames AT2 in order to determine the moments when they are received, and to deduce therefrom the time slot that separates the moments when the successive check frames AT2 arriving from the traffic station TSi associated thereto. Each compressor/decompressor 7 is also tasked with comparing each time slot to a selected threshold, in order to transmit to the traffic station TSi which is associated with it an alert signal whenever the duration of a time slot is greater than the selected threshold. This alert signal is intended to notify the recipient traffic station TSi of the absence of a check frame.

For example, the alert signal may be a simple binary signal. However, in one variant, it may be a numeric value representing the duration of the time slot.

In such a case, each traffic station TSi detects (for example using its first processing module PM1) the congestion of anticipated (second) traffic, representative of insufficient transmission resources, whenever it receives an alert signal arriving from the management center MC.

A second solution requires numbering each check frame AT2. In this case, each compressor/decompressor 7 of the hub is permanently tasked (for example, by using its load assessment module 16) with detecting the presence of check frames AT2 in order to determine the number that is associated with them. It may thereby detect each skipped number between check frames AT2 transmitted by the traffic station TSi which is associated thereto, and transmit to said traffic station TSi an alert signal whenever it detects a skip (the non-receipt of at least one check frame).

As with the first solution, the alert signal may be a simple binary signal. However, in one variant, it may be a numeric value representative of the number of non-received check frames.

In such a case, each traffic station TSi detects (for example using its first processing module PM1) the congestion of anticipated (second) traffic, representative of insufficient transmission resources, whenever it receives an alert signal arriving from the management center MC.

It shall be noted that the first and second solutions may be combined. In this case, the alert signal may, for example, include a numeric value representative of the duration of the time slot and/or of the number of non-received check frames.

A third solution requires adding a time marker to each check frame AT2, for example, such as by using each first processing module PM1. This time marker represents the time when the check frame AT2 was created, synchronized to a clock in the management center MC. In this case, each compressor/decompressor 7 of the hub H, is permanently tasked (for example, using its load assessment module 16) with detecting the presence of the check frames AT2 in order to date the moments when they were received, then determining the transmission duration of each check frame AT2 based on its time of creation and the moment it was received.

The transmission duration for a check frame AT2 is roughly equal to the sum of its processing time in terminal T, its transmission duration (which is nearly invariable), the processing time (nearly invariable) introduced by the demodulator 5 of the hub H that is associated with the traffic station TSi which transmitted it, and the time introduced by the switching matrix located between the demodulator 5 and the corresponding compressor/decompressor 7, which is low, or even negligible if the switching matrix is too large. Consequently, each variation in transmission duration essentially characterizes a variation in the processing time in terminal T, which results in a potential lack of transmission resources.

Each compressor/decompressor 7 may therefore transmit an alert signal to the traffic station TSi which is associated with it whenever it detects a variation in transmission duration and a check frame AT2 that it transmitted.

As with the first and second solutions, the alert signal may be a simple binary signal. However, in one variant, it may be a numeric value representative of the amplitude of the detected variation in transmission duration.

In such a case, each traffic station TSi detects (for example using its first processing module PM1) the congestion of anticipated (second) traffic, representative of insufficient transmission resources, whenever it receives an alert signal arriving from the management center MC.

A fourth solution consists of configuring each compressor/decompressor 7 of the hub H so that it permanently detects (for example, using its assessment module 16 or its switching matrix) the check frames AT2 in order to send them back to the traffic station TSi which is associated with it and which transmits them.

In such a case, each traffic station TSi may, for example, detect (for example, by using its first processing module PM1) the arrival of each check frame AT2 sent back, and the moment when it was received, and deducing therefrom the time that it took to return to it. For example, the compressor/decompressor CD may be used to extract the check frames AT2 from the traffic arriving from the management center MC and to determine the round-trip time for each check frame AT2 extracted, and to compare (for example, by using its first processing module PM1) this round-trip time to a selected threshold.

Thus, whenever a round-trip time is greater than the selected threshold (or if a check frame AT2 is not received), the traffic station TSi deduces therefrom whether there is a congestion of (second) anticipated traffic AT, representative of insufficient transmission resources.

It is preferable to detect, within the management center, each loss of check frames AT2 owing to a weakening of reception, or a degradation in the transmission link Li in question (caused, for example, by interference).

This task is preferably carried out by each demodulator 5 of the modem 1 of hub H. In this case, each demodulator 5 sends the corresponding compressor/decompressor 7 a piece of information (or an indicator) notifying it of a change in reception, or an incorrect frame being received. This piece of information (or indicator) is then sent by the compressor/decompressor 7 of the hub H back to the compressor/decompressor CD of the traffic station TSi which is associated with it. This information then notifies the traffic station TSi that no decision may be made regarding the missing check frame AT2.

As a reminder, the congestion detection mechanisms described hereinabove pertain only to anticipated congestion, i.e. congestion related to anticipated traffic AT (as well as, occasionally, the margin ST used in the process for smoothing the useful traffic UT). It therefore has no impact on the useful traffic UT.

Furthermore, these congestion detection mechanisms are intended to enable each traffic station TSi to estimate the quantity of transmission resources (or capacity) that were allocated to it by the management center MC during the last allocation cycle. Thanks to this determination, each traffic station TSi approximately knows which resources it has, without needing to exchange signaling messages with the management center MC.

These mechanisms may be completed by mechanisms for regulating the anticipated traffic AT in order to enable each traffic station TSi to determine precisely, and not approximately, which resources have been allocated to it by the management center MC. Multiple mechanisms for regulating the anticipated traffic AT may be foreseen. These mechanisms are not dependent on the congestion detection mechanisms used in parallel.

A first solution consists of configuring each traffic station TSi so that the first processing module PM1 of its compressor/decompressor CD maintains the stream of anticipated traffic AT present just before the anticipated (second) traffic AT is detected by the absence of one or more check frames AT2 or by the existence of an abnormal time difference between two check frames AT2 being received. In this case, each traffic station TSi identifies which resources were allocated to the resources SL'+AT which were available prior to the detection of the congestion of anticipated traffic AT.

A second solution consists of configuring each traffic station TSi so that each time the first processing module PM1 of its compressor/decompressor CD detects a congestion of anticipated (second) traffic AT, it gradually reduces the volume of anticipated traffic AT until the congestion of anticipated traffic AT disappears. In this case, each traffic station TSi identifies which resources were allocated to the resources SL'+AT which were available at the time of the disappearance of congestion of anticipated traffic AT.

A third solution consists of configuring each traffic station TSi so that each time the first processing module PM1 of its compressor/decompressor CD does not detect congestion of anticipated (second) traffic AT, it gradually increases the second traffic until it detects a congestion of anticipated traffic notifying it that the limit of capacity (or resources) available has been reached. In this case, each traffic station TSi identifies which resources were allocated to the resources SL'+AT which were available prior to the detection of the congestion of anticipated traffic AT.

A fourth solution requires the usage of alert signals made up of a numeric value representative of the duration separating the moments when successive check frames are received. It consists of configuring each traffic station TSi so that the first processing module PM1 of each compressor/decompressor CD modulates the anticipated (second) traffic AT by a value dependent on the difference between the current numeric value of the alert signal and the average value of this numeric value. This modulation value may, for example, be equal to the result of the above-mentioned difference. The anticipated traffic AT is then modified depending on the result of the difference, as set forth below:

- if the difference is positive and high, a significant instance of aggravated congestion, the anticipated traffic is heavily reduced, in order to quickly end this congestion situation;
- if the difference is positive but low, a significant instance of early congestion, the traffic AT is slightly reduced;
- if the difference is nil, the traffic AT is kept at its current value, which is the case whenever the anticipated traffic AT has correctly converged towards the actual quantity of allocated resources;
- on the other hand, as long as the difference is negative, the traffic AT may be increased.

This solution makes is possible to cause the anticipated traffic AT to accurately converge with the current value of allocated resources, and therefore to determine the volume of allocated transmission resources without requiring any exchange between the remote station TSi and the management center MC.

The use of the result and the abovementioned difference makes it possible to avoid any oscillatory effect in the anticipated traffic AT regulation loop which is thereby formed.

In this case, each traffic station TSi identifies the resources allocated to the resources ST'+AT which are available whenever the difference between the current numeric value of the alert signal and the average of this value is nil or close to 0, or by extension to the ST'+AT resources used, corrected proportionally based on the abovementioned difference. Conventional smoothing techniques used in regulation loops make it possible to avoid any oscillatory effect in the mechanism thereby formed, and thereby to obtain a fairly accurate value for the resources allocated by averaging the overall resources used for the traffic ST'+AT.

Whichever technique is used by a traffic station TSi for determining the resources which were actually allocated to it, each time that it detects that the resources allocated are unsuitable to its needs for transmitting useful traffic UT, the first processing module PM1 of its compressor/decompressor CD is configured in such a way as to delete the frames present on these channels (of its link Li) which were not active prior to the moment when the congestion (and therefore the unsuitability) appeared. For example, if the channel in question is a voice or data channel, the communication being established is rejected at the network level. This deletion problem is preferentially treated on a channel-by-channel basis.

In the foregoing description, an implementation of the invention has been described for transmitting traffic from traffic stations TSi to the management center MC. However, the invention applies in the same manner to the transmission of traffic from the management center MC to the traffic stations TSi. The benefit, however, is more limited in this direction, as the coupling between the compressors/decompressors 7 and the management module 13 of the hub H, located on the same site, generally have no problems with expressing the needs for transmission resources, and on the return path, with knowing what the actual resource allocations are, and therefore with regulating the streams. In this case, the improvements made to the traffic stations TSi, described hereinabove, must be transposed in the management center MC, and conversely, the improvements made to the management center MC, described hereinabove, must be transposed in the traffic stations TSi.

The compression/decompression means 6 of the hub H and the first PM1 and second PM2 processing modules of the traffic stations (TSi) may be created in the form of electronic circuits, software (or computing) modules, or a combination of circuits and software.

The invention offers a certain number of benefits, in particular:
- it bypasses direct coupling between the compression/decompression means of the traffic stations and the management module (DAMA or a derivative thereof) of the management center;
- it makes it possible to efficiently manage workload control in heterogeneous networks where resources are shared in multiple locations (for example, over a satellite link and then over a terrestrial link),
- it makes it possible to increase the efficiency of the resource allocation distribution mechanism (DAMA or a derivative thereof), by making the margin implemented in resource allocations suitable for the current characteristics of the traffic being carried.

The invention is not limited to the embodiments of the hub, management center, transmission terminal, compression/decompression means, and traffic station described above, which are only given as an example; rather, it encompasses all variants that a person skilled in the art may envision within the framework of the claims below.

In this manner, the invention has been described in an application for TDMA transmission. However, the invention also applies to SCPC, FDMA, and CDMA transmission, or any other type of transmission relying on dynamically sharing transmission resources.

Furthermore, the invention applies to compression/decompression devices operating on pre-compression signals, carried by frames or by packets, or by circuits.

The invention claimed is:

1. A method for reserving resources within a point-to-multipoint or multipoint-to-multipoint communication network, in which radio links (Li) have been established between remote traffic stations (TSi) and a management center (MC), said links (Li) sharing resources dynamically allocated by said management center (MC), characterized in that said method comprises, when additional resources are needed within a traffic station to increase the useful traffic to be transmitted to said management center (MC), the steps of
   attaching to this useful traffic a first traffic representative of a selected margin, and a second traffic whose volume is representative of an anticipation of said need for additional resources, in such a way as to implicitly solicit said management center (MC),
   determining by said management center whether or not additional resources should be allocated, based at least in part on said volume of said second traffic;
   then determining within said traffic station (TSi) whether the additional resources were allocated by the management center (MC), and
   if additional resources were allocated, increasing the useful traffic by an amount that corresponds as much as possible to the sum of the resources corresponding to the first traffic and said allocated additional resources, or if no additional resources were allocated, blocking any establishment of a new traffic channel until additional resources are obtained.

2. A point-to-multipoint or multipoint-to-multipoint communication network, comprising at least one management center (MC) and remote traffic stations (TSi) between which radio links (Li) were established sharing resources dynamically allocated by said management center (MC), characterized in that
   each traffic station (TSi) is configured, when additional resources are needed to increase the useful traffic that it must transmit to the management center (MC), to add to the current useful traffic a first traffic representative of a selected margin and a second traffic whose volume is representative of an anticipation of said need for additional resources, in such a way as to implicitly solicit said management center (MC),
   said management center is configured to determine if additional resources should be allocated based at least in part on said volume of said second traffic, and
   each traffic station is further configured then to determine whether said additional resources were allocated by said management center (MC), and if additional resources were allocated, to increase the useful traffic by an amount that corresponds as much as possible to the sum of the resources corresponding to the first traffic and said allocated additional resources.

3. A network according to claim 2, characterized in that each traffic station (TSi) is configured to add to its useful traffic augmented by said first traffic a second traffic corresponding to an integer N of resource allocation steps by said management center (MC), with N>0.

4. A network according to claim 2, characterized in that each traffic station (TSi) is configured to add to its useful traffic augmented by said first traffic a constant second traffic.

5. A network according to claim 2, characterized in that each traffic station (TSi) is configured to add to its useful traffic augmented by said first traffic a second traffic that varies depending on local statistics of the change in its useful traffic over time.

6. A network according to claim 2, characterized in that each traffic station (TSi) is configured to add to its useful traffic augmented by said first traffic a second traffic that varies depending on the respective numbers transmission channels used by its useful traffic to transmit frames of different types.

7. A network according to claim 2, characterized in that each traffic station (TSi) is configured to assign a priority level to the second traffic, and at least one priority level, greater than that of said second traffic, to its useful traffic.

8. A network according to claim 7, characterized in that each traffic station (TSi) is configured to assign the first traffic a priority level between those of the second traffic and the useful traffic.

9. A network according to claim 2, characterized in that each traffic station (TSi) is configured to transmit said second traffic in the absence of useful traffic waiting to be transmitted.

10. A network according to claim 2, characterized in that each traffic station (TSi) is configured to multiplex the frames that make up said second traffic with the frames that make up said useful traffic augmented by said first traffic, waiting to be transmitted, based on a selected proportion.

11. A network according to claim 2, characterized in that each traffic station (TSi) is configured to add to its useful traffic augmented with said first traffic a second traffic made up of filler frames and check frames.

12. A network according to claim 11, characterized in that said management center (MC) is configured to send each check frame received back to the traffic station (TSi) that transmitted it, and in that each traffic station (TSi) is configured to determine the time taken by each check frame to return to it, and to detect a congestion of second traffic whenever said time is greater than a selected threshold.

13. A network according to claim 11, characterized in that said management center (MC) is configured to detect the moments when said check frames are received, to determine a time slot separating the moments when successive check frames are received from each traffic station (TSi), and to transmit to a traffic station (TSi) an alert signal whenever the duration separating the moments when successive check frames that it transmitted were received is greater than a selected threshold, and in that each traffic station (TSi) is configured to detect a congestion of second traffic in the event that an alert signal is received from said management center (MC).

14. A network according to claim 11, characterized in that each traffic station (TSi) is configured to transmit numbered check frames, and in that said management center (MC) is configured to detect the number associated with each check frame transmitted by each traffic station (TSi), and to transmit to a traffic station (TSi) an alert signal if at least one of the check frames that it successively transmitted was not received, and in that each traffic station (TSi) is configured to detect a congestion of second traffic if an alert signal is received from said management center (MC).

15. A network according to claim 11, characterized in that each traffic station (TSi) is configured to transmit check frames equipped with a time marker representing an time of creation synchronized to a clock in said management center (MC), in that said management center (MC) is configured to date the moment when each check frames transmitted by each traffic station (TSi) is received, to determine the transmission duration of each check frame based on its time of creation and the moment it was received, and to transmit an alert signal to a traffic station (TSi) if a variation is detected in the transmission duration of a check frame that it transmitted, and in that each traffic station (TSi) is configured to detect a congestion of second traffic if an alert signal is received from said management center (MC).

16. A network according to claim 13, characterized in that said management center (MC) is configured to transmit alert signals made up of a binary indicator.

17. A network according to claim 13, characterized in that said management center (MC) is configured to transmit alert signals made up of a numeric value representative of a determined duration whenever said duration is greater than said threshold and/or is representative of the number of check frames not received.

18. A network according to claim 15, characterized in that said management center (MC) is configured to transmit alert signals made up of a numeric transmission value representative of the amplitude of a variation in the detected transmission duration.

19. A network according to claim 13, characterized in that said management center (MC) is configured to detect each weakening of traffic reception and each degradation of a link (Li), and, if one or more check frame(s) are not received from a traffic station (TSi) for a duration greater than a selected threshold, to transmit to said traffic station (TSi) a warning signal notifying it that a decision cannot be made.

20. A network according to claim 12, characterized in that each traffic station (TSi) is configured, whenever a congestion of second traffic is detected, to keep the addition of the second traffic, and to consider the resources which were available prior to said detection of said congestion of second traffic to be allocated resources.

21. A network according to claim 12, characterized in that each traffic station (TSi) is configured, whenever a congestion of second traffic is detected, to gradually reduce said second traffic until said congestion of second traffic disappears, and to consider the resources which were available prior to said disappearance to be allocated resources.

22. A network according to claim 12, characterized in that each traffic station (TSi) is configured, whenever a congestion of second traffic is detected, to gradually increase said second traffic until a congestion of second traffic is detected, and to consider the resources which were available prior to said detection of said congestion of second traffic to be allocated resources.

23. A network according to claim 17, characterized in that, in the presence of alert signals made up of a numeric value representative of a duration separating the moments when successive check frames were received, each traffic station (TSi) is configured to modulate said second traffic by a value that varies depending on the difference between the numeric value of the alert signal received and an average value of said numeric value.

24. A network according to claim 20, characterized in that each traffic station (TSi) is configured, whenever it detects an insufficiency in the resources allocated to it, to delete frames on the transmission channels of its link (Li) which were without activity prior to said detection.

* * * * *